United States Patent [19]

Shigenobu et al.

[11] Patent Number: 4,506,596

[45] Date of Patent: Mar. 26, 1985

[54] BEVERAGE BREWING APPARATUS

[75] Inventors: Hiromichi Shigenobu; Takao Nakabayashi, both of Maebashi; Kitio Akiyama, Fujioka; Masao Miida, Numata; Hisashi Karasawa, Takasaki, all of Japan

[73] Assignee: Toshiba Electric Appliances Co., Ltd., Maebashi, Japan

[21] Appl. No.: 614,556

[22] Filed: May 29, 1984

[51] Int. Cl.³ .............................................. A47J 31/36
[52] U.S. Cl. ................................... 99/289 T; 99/302 R; 99/302 P
[58] Field of Search ............ 99/289 R, 289 T, 289 D, 99/289 P, 297, 299, 300, 302 R, 302 P; 426/433

[56] References Cited

U.S. PATENT DOCUMENTS

| | | | |
|---|---|---|---|
| 3,203,340 | 8/1965 | Totten | 99/289 R |
| 3,221,637 | 12/1965 | Small et al. | 99/289 R |
| 3,349,690 | 10/1967 | Heier | 99/289 |
| 3,374,727 | 3/1968 | Wright | 99/289 |

*Primary Examiner*—Robert W. Jenkins
*Attorney, Agent, or Firm*—Oblon, Fisher, Spivak, McClelland & Maier

[57] ABSTRACT

A beverage brewing apparatus according to the present invention is provided with a brewing cylinder. A pressurizing piston is slidably fitted in the brewing cylinder. The pressurizing piston, in conjunction with a coffee filter tape, defines a brewing chamber inside the brewing cylinder. The pressurizing piston compresses coffee powder fed into the brewing chamber. When the powder is pressurized by the pressurizing piston in the brewing chamber, extremely hot pressurized hot water is poured into the brewing chamber by a hot-water supply mechanism. As a result, a coffee solution percolated in the brewing chamber runs out therefrom through the filter tape.

11 Claims, 22 Drawing Figures

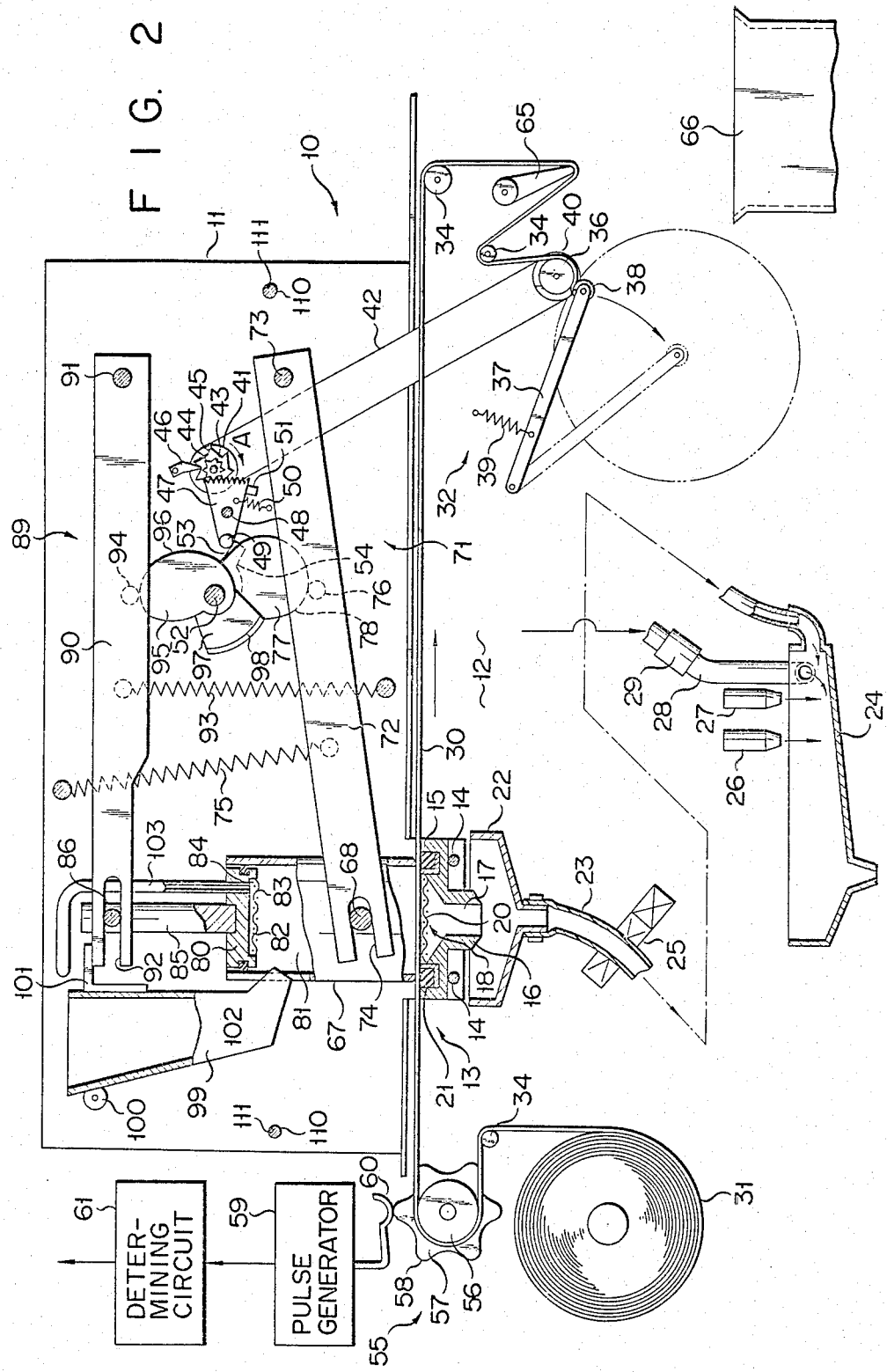

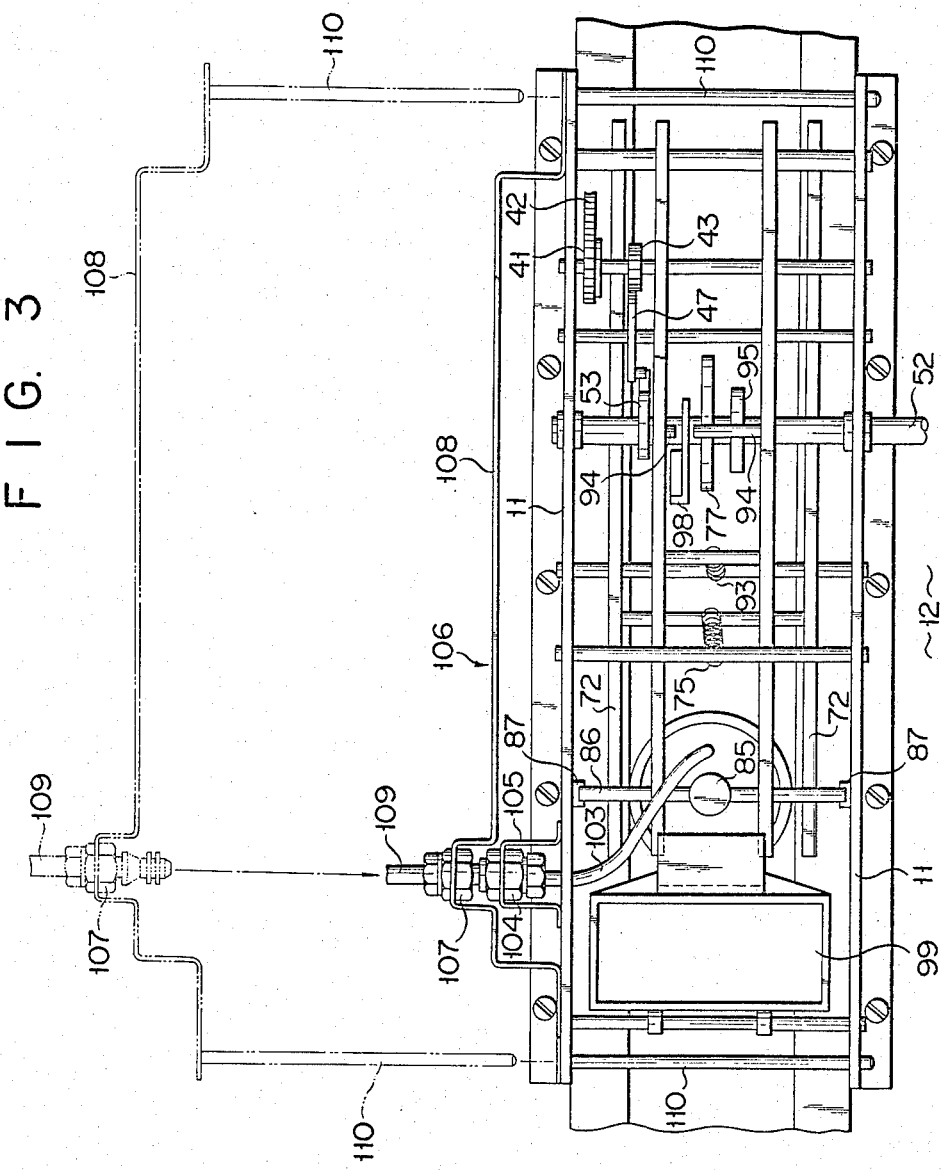

BEVERAGE BREWING APPARATUS

BACKGROUND OF THE INVENTION

The present invention relates to a beverage brewing apparatus adapted to prepare a beverage solution by immersing coffee powder or another type of powder in hot water and brewing the essence of this powder, and more specifically to a beverage brewing apparatus suited for an automatic vending machine.

Beverage brewing apparatuses of this type are stated in U.S. Pat. Nos. 3,203,340 and 3,221,637. In any of these conventional beverage brewing apparatuses applied to automatic coffee vending machines, a coffee solution is prepared on the same principle as in the so-called dripolator for household use. Namely, a coffee solution is obtained by immersing coffee powder in hot water so that the essence of the coffee powder is extracted into the hot water. In the prior art beverage brewing apparatuses, moreover, a cupful of coffee solution is produced by one cycle of brew and poured into a cup to be served to a customer.

The aforementioned conventional beverage brewing apparatuses have some drawbacks as follows. First, it takes much time to brew a coffee solution by immersing coffee powder in hot water, that is, to brew a cupful of coffee. This implies that these apparatuses, if applied to an automatic vending machine, force a customer (user of the vending machine) to have to wait a long time for a cup of coffee after he or she puts coins into the vending machine. Thus, the vending machine cannot fulfill its most essential requirement, fast service.

Secondly, the conventional method of coffee percolation is low in brewing efficiency, since the coffee powder cannot be in good contact with hot water. In other words, a lot of hot water would be used without touching the coffee powder. Therefore, the production of a desired quantity of coffee solution by brewing requires an increased amount of coffee powder, raising the cost of a every cup.

SUMMARY OF THE INVENTION

The object of the present invention is to provide a beverage brewing apparatus capable of shortening the time required for the production of a beverage solution by brewing, and of reducing the cost of the beverage solution.

The above object of the invention may be attained by an apparatus for extracting a beverage solution by brewing, which comprises: a base; a stage attached to the base, the stage's surface having a brewing hole which is covered with a rigid sheet member having a number of perforations which is substantially flush with the stage surface; an elongate filter tape capable of traveling over the stage surface of the stage and the sheet member; filter tape driving means for intermittently driving the filter tape by inches, thereby intermittently locating new parts of the filter tape on the stage surface of the stage and the sheet member; a hollow brewing cylinder disposed on the stage surface side of the stage and having an axis perpendicular to the stage surface, at least one end of the brewing cylinder nearer to the stage being open; brewing cylinder moving means adapted to move the brewing cylinder axially, thereby bringing the open end of the brewing cylinder into liquid-tight contact with the stage surface of the stage with the filter tape therebetween so that the open end of the brewing cylinder surrounds the brewing hole, and separating the open end of the brewing cylinder at a predetermined distance from the stage surface of the stage; a pressurizing piston slidably disposed in the brewing cylinder and designed so that a brewing chamber is defined inside the brewing cylinder by the inner wall surface of the brewing cylinder, the pressurizing piston, and the filter tape when the open end of the brewing cylinder is in liquid-tight contact with the stage surface through the medium of the filter tape; piston moving means for axially moving the pressurizing piston in the brewing cylinder; powdered beverage supply means for feeding a predetermined quantity of powdered beverage as the solute for the beverage solution into the brewing chamber defined inside the brewing cylinder; and hot-water supply means adapted to supply the brewing chamber with hot water pressurized to a predetermined pressure when the powdered beverage is fed into the brewing chamber and pressurized by the pressurizing piston.

According to the present invention, the beverage solution is percolated by injecting the brewing chamber of the brewing cylinder with the hot water pressurized to the predetermined pressure when the powdered beverage fed into the brewing chamber is pressurized by the pressurizing piston. Thus, the hot water is forced to pass through the powdered beverage, so that the beverage solution can be percolated in a short time. If applied to an automatic vending machine, therefore, the beverage brewing apparatus of the present invention can ensure speedy delivery of the beverage solution, greatly reducing the customer's waiting time.

When the hot water under the predetermined pressure is forced to poure into the brewing chamber of the brewing cylinder, the powdered beverage in the brewing chamber has been pressurized by the pressurizing piston. Therefore, the hot water is passed through the very fine voids defined between the grains of the powder, so that the powdered beverage and the hot water may enjoy good contact. In the other words, part of the hot water is passed into the powder without contacting the grains of the powder is substantially reduced. Thus, the efficiency of beverage brew is improved, and the desired beverage solution can be percolated by the use of less powder. As a result, the quantity of the powdered beverage required for a given amount of beverage solution can be reduced, thus lowering the cost of the beverage solution.

In addition, as the efficiency of beverage brew is improved, the grains of the powdered beverage can be more fined, thus the quantity of the powdered beverage required can be further reduced. Further, as the filter tape is used, the beverage solution excels in the sanitation and has a delicious taste.

The above and other objects and advantages of the present invention will be apparent in the following detailed description of the embodiments thereof which is to be read in connection with the accompanying drawings.

BRIEF DESCRIPTION OF THE DRAWINGS

FIG. 2 is a schematic sectional view of a beverage brewing apparatus for an automatic coffee vending machine according to one embodiment of the present invention;

FIG. 3 is a plan view of the beverage brewing apparatus shown in FIG. 2;

DETAILED DESCRIPTION OF THE PREFERRED EMBODIMENTS

Figure 1:
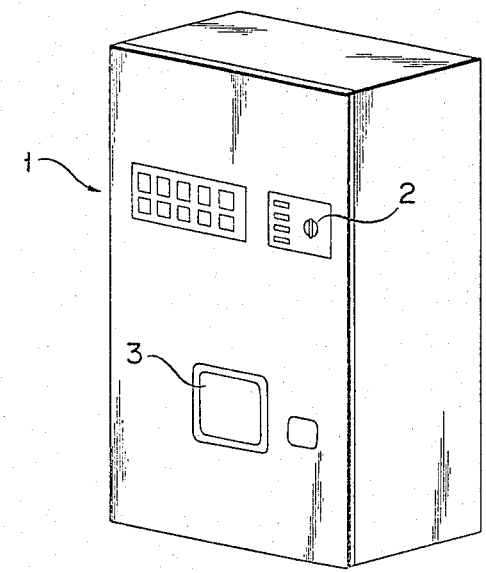
FIG. 1 is a perspective view showing an automatic coffee vending machine.

Referring now to FIG. 1, there is shown an automatic coffee vending machine 1 to which is applied a beverage brewing apparatus according to the present invention. The automatic coffee vending machine 1 is designed so that a desired coffee solution is poured into a cup when a customer puts some coins into the vending machine 1 through a coin slot 2 and pushes one of the selecting buttons. The cup filled with the coffee solution can be taken out from the vending machine 1 through an outlet 3 thereof.

FIGS. 2 and 3 show an outline of a beverage brewing apparatus according to one embodiment of the invention incorporated in the automatic vending machine 1. The beverage brewing machine is provided with a brewing unit 10. The brewing unit 10 has a pair of side plates 11 spaced and facing each other to form a base structure. As seen from FIG. 3, the side plates 11 are each fixed to a frame 12 of the vending machine 1 by means of a plurality of fixing screws. As shown in FIG. 2, a substantially disk-shaped stage 13 is provided under the side plates 11. The stage 13 is supported by a pair of parallel pins 14 which are supported at each end by the side plates and extend horizontally between the side plates 11. Thus, the stage 13 is positioned by the parallel pins 14 so that its stage surface 15 is horizontal. A boss 16 is integrally formed on the undersurface of that end face of the stage 13 which is on the opposite side of the stage surface 15. A brewing hole 17 is formed in the stage 13. The brewing hole 17 opens to the stage surface 15 at one end and to the lower end of the boss 16 at the other end. The opening 18 of the brewing hole 17 in the stage surface 15 is greater diameter than the opening of the hole 17 at the lower end of the boss 16. The opening 18 is fitted with a rigid wire net 20. It is to be noted that the upper surface of the wire net 20 is flush with the stage surface 15 of the stage 13. Alternatively, the wire net 20 may be replaced with a rigid metal sheet with a number of perforations. A ring-shaped packing 21 is buried in the stage surface 15 so as to surround the wire net 20. The upper surface of the packing 21 is also flush with the stage surface 15.

In FIG. 2, a funnel 22 is disposed right under the stage 13. The funnel 22 is connected to a trough 24 by means of a flexible hose 23. A pinch valve 25 is attached to the middle portion of the hose 23. The pinch valve 25 opens and closes a passage inside the hose 23 with a predetermined timing that will be mentioned later. Arranged above the trough 24 are nozzles 26 and 27 for feeding sugar and milk, respectively, into the trough 24. The trough 24 is connected with one end of a hot-water hose 28 for feeding hot water of about 65° C. into trough 24. The other end of the hot-water hose 28 is connected to a low-temperature hot water source (not shown). Provided in the middle of the hot-water hose 28 is a pinch valve 29 which opens and closes a passage inside the hot-water hose 28 with a predetermined timing mentioned later.

A paper cup (not shown) supplied from a cup feeding mechanism (not shown) is placed under the trough 24.

An elongated filter tape 30 for coffee extends over the stage surface 15 of the stage 13 and the wire net 20. The filter tape 30 is formed of paper, cotton, rayon, or some other suitable filter material. As shown in FIG. 2, the filter tape 30 is fed from a supply roll 31, and travels under the brewing unit 10 between the side plates 11 thereof, extending along the longitudinal direction of the brewing unit 10. Thus, the filter tape 30 is led onto the stage surface 15 of the stage 13 and the wire net 20, and then to a take-up mechanism 32. In FIG. 2, numeral 34 designates guide rollers 34 for the filter tape 30.

The take-up mechanism 32 will now be described. Below the brewing unit 10, a pinch roller 36 is rotatably mounted on the frame 12 of the vending machine 1. Beside the pinch roller 36, a swinging arm 37 is rockably supported at one end on the frame 12 by means of a pin. A take-up roll 38 is rotatably mounted on the other end of the swinging arm 37. An urging spring 39 is stretched between the swinging arm 37 and the frame 12. One end of the urging spring 39 is coupled to the swinging arm 37, and the other to the frame 12. Thus, as the swinging arm 37 is urged to rock counterclockwise by the urging spring 39, the take-up roll 38 is brought resiliently into rolling contact with the pinch roller 36.

A sprocket 40 is mounted on the roller shaft of the pinch roller 36, while a sprocket 41 as the counterpart of the sprocket 40 is disposed at the right end portion of the brewing unit 10 between the side plates 11 thereof. The sprocket 41 is mounted on a sprocket shaft which is rotatably supported on the side paltes 11. An endless chain 42 is stretched between the two sprockets 40 and 41. A pinion 43 is coupled to the sprocket shaft by means of a one-way clutch (not shown). The one-way clutch connects the sprocket 41 and the pinion 43 so that they can rotate together in the direction of arrow A in FIG. 2 and independently in the direction opposite to the direction of arrow A. A ratchet wheel 44 is further mounted on the sprocket shaft of the aprocket 41. A ratchet claw 46 rockably supported on the frame 12 engages the ratchet teeth 45 of the ratchet wheel 44. The ratchet wheel 44 and the ratchet claw 46 permit only the rotation of the sprocket 41 in the direction of arrow A, and prevent the sprocket 41 from rotating in the direction opposite to the direction of arrow A.

A substantially fan-shaped gear 47 is disposed near the sprocket 41. The gear 47 is rotatably supported at the central portion on the frame 12 by a gear shaft 48. The gear 47 has a plurality of teeth on its arcuate surface centering around the gear shaft 48. The teeth of the gear 47 are in mesh with the pinion 43. A pin 49 protrudes from that end portion of the gear 47 on the opposite side to the toothed surface. The gear 47 is urged to rock clockwise around the gear shaft 48 by a spring 50 one end of which is coupled to the gear 47 and the other end to the frame 12. Thus, the gear 47 abuts against a stopper 51 which is fixed to the frame 12.

Beside the gear 47, a drive shaft 52 extends parallel to the sprocket shaft of the sprocket 41. The drive shaft 52 is rotatably supported on the side plates 11 of the brewing unit 10. The drive shaft 52 is rotated by an electric motor (not shown). A cam 53 for intermittent drive is mounted on the drive shaft 52. A cam projecting 54 radially extending from the cam 53 can engage the pin 49 of the gear 47 as the cam 53 rotates.

The operation of the take-up mechanism 32 for the filter tape 30 will now be described. As mentioned before, the filter tape 30 played out from the supply roll 31 is led onto the stage surface 15 of the stage 13 and the wire net 20, and is then delivered to the pinch roller 36 by the guide rollers 34. Thus, the filter tape 30 is held between the pinch roller 36 and the take-up roll 38 so that the forward end of the filter tape 30 is fixed to the take-up roll 38. In this state, the cam 53 is rotated clockwise as the drive shaft 52 rotates. Then, after the cam 53 with its cam projection 54 positioned as shown in FIG. 2 substantially makes one revolution, the cam projection 54 abuts against the pin 49 of the gear 47, thereby rocking the gear 47 counterclockwise against the urging force of the spring 50. As the gear 47 rotates in this manner, the sprocket 41 is rotated clockwise through a predetermined angle through the medium of the pinion 43. The rotation of the sprocket 41 is transmitted to the pinch roller 36 by means of the chain 42 and the sprocket 40, thereby rotating the pinch roller 36 through a given angle. As the pinch roller 36 rotates in this manner, the take-up roll 38 in rolling contact therewith is rotated, so that the filter tape 30 held between the pinch roller 36 and the take-up roll 38 is wound on the take-up roll 38 for a certain length. As the filter tape 30 is wound in this way, it is played out from the supply roll 31. After the cam projection 54 of the cam 53 is disengaged from the pin 49 of the gear 47 by the rotation of the cam 53, the gear 47 is rocked clockwise by the urging force of the spring 50 until it engages the stopper 51. However, since the pinion 43 and the sprocket 41 are coupled by means of the one-way clutch, the clockwise rocking of the gear 47 will never be transmitted to the sprocket 41 through the pinion 43. In the take-up mechanism 32 for the filter tape 30 described above, therefore, the filter tape 30 can be intermittently driven by a predetermined length at a time so that new parts of the filter tape 30 are successively positioned at least on the stage surface 15 of the stage 13 by continuously rotating the drive shaft 52.

Figure 4:
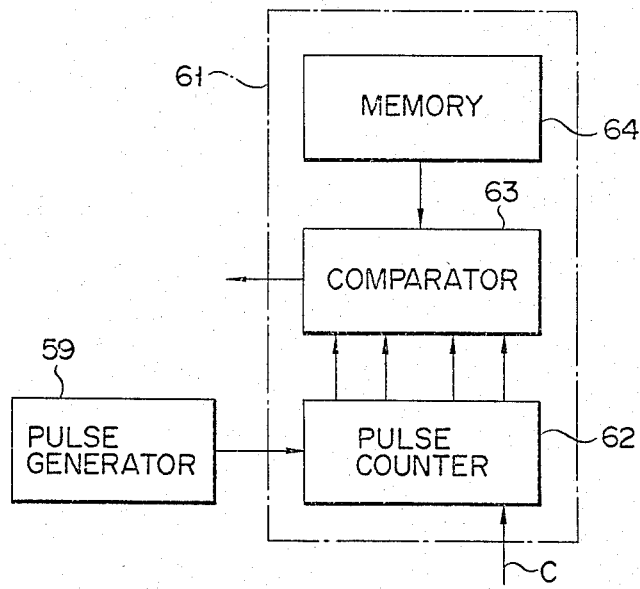
FIG. 4 is a block diagram of an electric circuit for determining the delivery of a filter tape.

In the present embodiment of the present invention, the beverage brewing apparatus is provided with a decision mechanism 55 for checking to see if the filter tape 30 is intermittently played out from the supply roll 31 with accuracy. The decision mechanism 55 includes a guide pulley 56 for the filter tape 30 located between the supply roll 31 and the stage 13. The guide pulley 56 is rotatably supported on the frame 12 by a pulley shaft. Thus, as shown in FIG. 2, the filter tape 30 fed from the supply roll 31 is led through the guide pulley 56 to the side of the stage 13. A cam wheel 57 is mounted on the pulley shaft of the guide pulley 56. A plurality of radially extending cam projections 58 are formed on the outer peripheral surface of the cam wheel 57, arranged circumferentially at regular intervals. A pulse generator 59 is disposed over the cam wheel 57. The pulse generator 59 has an actuator lever 60 for pulse generation, whose extreme end is urged to abut against the cam surface of the cam wheel 57. Thus, as the filter tape 30 is intermittently played out, the guide pulley 56 and hence the cam wheel 57 are rotated, so that the cam projections 58 of the cam wheel 57 vertically oscillate the actuator lever 60 of the pulse generator 59, thereby making and breaking a switch (not shown) for pulse generation in the pulse generator 59. Thus, the pulse generator 59 delivers a pulse signal in accordance with the oscillation of the actuator lever 60. The pulse signal from the pulse generator 59 is applied to a determining circuit 61. The determining circuit 61 compares the number of pulses of the pulse signal from the pulse generator 59 with a preset pulse number range, thereby determining whether the filter tape 30 is played out accurately for the predetermined length. Specifically, for example, the determining circuit 61 comprises a pulse counter 62 which counts the pulses of the input pulse signal and deliers a count number smaller than the number of the actually counted pulses by one or two, a comparator 63 which compares the count number delivered from the pulse counter 62 with a preset count number range and delivers an error signal when the two count numbers is not coincident with the range of the preset count numbers, and memory 64 for setting the count number, as shown in FIG. 4. When the error signal is delivered from the comparator 63, the electric motor for rotating the drive shaft 52, for example, is stopped. The count number set by the memory 64 may range within a certain limit. In FIG. 4, arrow C indicates that a clear signal is applied to the pulse counter 62 to clear the same before the filter tape 30 is intermittently played out.

Constructed in this manner, the decision mechanism 55 can securely check to see if the filter tape 30 is intermittently played out with accuracy. Also, the decision mechanism 55 can detect the presence of the filter tape 30 on the supply roll 31.

A guide claw 65 is disposed between the two guide rollers 34 located on the right side of FIG. 2, whereby the path of travel of the filter tape 30 is made V-shaped at the section concerned. Under the guide claw 65 and the right-end guide roller 34 lies a waste bucket 66 to receive coffee grounds mentioned later.

Figure 5:
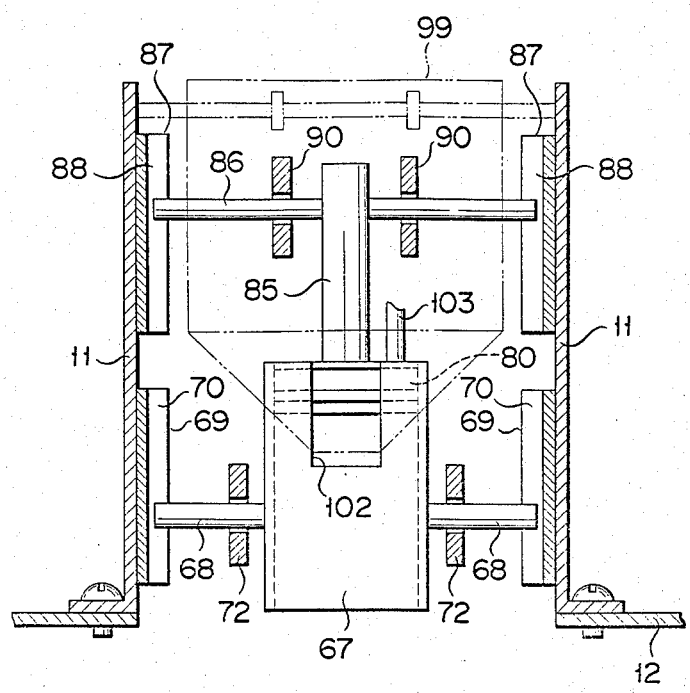
FIG. 5 is a sectional view taken along line V—V of FIG. 1.

A hollow brewing cylinder 67 is disposed between the two side plates 11 of the brewing unit 10 on the stage surface side of the stage 13. The brewing cylinder 67 is coaxial with the brewing hole 17 of the stage 13, and opens at both ends. The lower opening edge of the brewing cylinder 67 has a diameter such that it can engage the ring-shaped packing 21 of the stage 13. Pins 68 protruding from those portions of the outer peripheral surface of the brewing cylinder 67 which face the two side plates 11 extend toward the inner surfaces of their corresponding side plates 11. As shown in FIG. 5, the pins 68 of the brewing cylinder 67 are slidably fitted individually in guide grooves 70 of guide rails 69 which are fixed individually to the inner surfaces of the side plates 11. The guide grooves 70 of the guide rails 69 extend parallel to the axis of the brewing cylinder 67. Thus, the brewing cylinder 67 can move in the vertical direction of FIG. 2 in a manner such that the pins 68 are guided along the guide grooves 70 of their corresponding guide rails 69.

The brewing cylinder 67 is moved up and down by a lift mechanism 71. The lift mechanism 71 includes a pair of lift levers 72. The lift levers 72 extend along the side plates 11 of the brewing unit 10, located between the same. One end of each lift lever 72 is rockably coupled to a support shaft 73 which is supported between the right-end portions of the side plates 11. A slit 74 is formed at the other end of each lift lever 72, extending in the longitudinal direction of the lever 72. The pins 68 of the brewing cylinder 67 are fitted individually in the slits 74 of their corresponding lift levers 72. Each lift lever 72 is urged to rock upward by a return spring 75 which connects the lift lever 72 and its corresponding side plate 11. A pin 76 protrudes from the central portion of a lateral face of each lift lever 72. One of the pins 76 of the lift levers 72 are in contact with a cam surface 78 of a plane cam 77 for the brewing cylinder 67 mounted on the drive shaft 52.

Thus, in the lift mechanism 71 for the brewing cylinder 67 described above, the lift levers 72 are rocked up and down around the support shaft 72 with a timing depending on the shape of the cam surface 78 of the plane cam 77 as the drive shaft 52 is driven to rotate the plane cam 77. As the lift levers 72 rock in this manner, the brewing cylinder 67 is also moved up and down with a predetermined timing. The timing for the movement of the brewing cylinder 67 will be described later. In FIG. 2, the brewing cylinder 67 is located at its bottom dead point.

A pressurizing piston 80 is slidably fitted in the brewing cylinder 67 with the aid of an O-ring. When the brewing cylinder 67 is located at the bottom dead point as shown in FIG. 2 so that the lower open end of the brewing cylinder 67 is in liquid-tight contact with the ring-shaped packing 21 of the stage 13 through the filter tape 30, the pressurizing piston 80 defines a brewing chamber 81 inside the brewing cylinder 67. A circular depression 82 is formed in the lower surface of the pressurizing piston 80 facing the inside space of the brewing cylinder 67. A wire net 83 is attached to the depression 82 so that a hot water injection chamber 84 is defined between the bottom surface of the depression 82 and the wire net 83. The meshes of the wire net 83 are smaller than the grains of coffee powder fed into the brewing chamber 81 in the manner mentioned later.

The pressurizing piston 80 has a piston rod 85 which extends upward from the upper surface of the pressurizing piston 80. Pins 86 protrude individually from those portions of the outer peripheral surface of the piston rod 85 which face the two side plates 11, extending toward the inner surfaces of their corresponding side plates 11. As shown in FIG. 5, the pins 86 of the piston rod 85 are slidably fitted individually in guide grooves 88 of guide rails 87 which are fixed individually to the inner surfaces of the side plates 11, located above the guide rails 69. The guide grooves 88 of the guide rails 87 extend parallel to the axis of the piston rod 85. Thus, the pressurizing piston 80 can move in the vertical direction of FIG. 2 in a manner such that the pins 86 of the piston rod 85 are guided along the guide grooves 88 of the guide rails 87.

The pressurizing piston 80 is moved by a piston moving mechanism 89. The piston moving mechanism 89 is provided with a pair of pressurizing levers 90. The pressurizing levers 90 extend along the side plates 11 of the brewing unit 10, located between the same. One end of each pressurizing lever 90 is rockably coupled to a support shaft 91 which is supported over the support shaft 73 between the right-end portions of the side plates 11. A slit 92 is formed at the other end of each pressurizing lever 90, extending in the longitudinal direction of the lever 90. The pins 86 of the piston rod 85 are fitted individually in the slits 92 of their corresponding pressurizing levers 90. Each pressurizing lever 90 is urged to rock downward by an urging spring 93 which connects the pressurizing lever 90 and its corresponding side plate 11. A pin 94 protrudes from the central portion of a lateral face of each pressurizing lever 90. The pin 94 of one of the pressurizing levers 90 is in contact with a cam surface 96 of a plane cam 95 for the pressurizing piston 80 mounted on the drive shaft 52.

Thus, in the moving mechanism 89 for the pressurizing piston 80 described above, the pressurizing levers 90 are rocked up and down around the support shaft 91 with a timing depending on the shape of the cam surface 96 of the plane cam 95 as the drive shaft 52 is driven to rotate the plane cam 95. As the pressurizing levers 90 rock in this manner, the pressurizing piston 80 is also moved up and down with a predetermined timing. The timing for the vertical movement of the pressurizing piston 80 will be described later. In FIG. 2, the pressurizing piston 80 is located at its top dead point.

Figure 6:
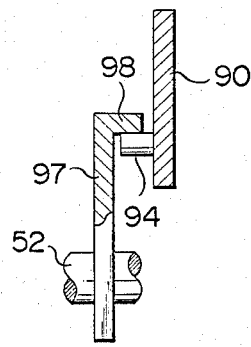
FIG. 6 is a side view, partially in section, showing a retaining device for a pressurizing lever.

A fan-shaped retaining plates 97 is mounted on the drive shaft 52. A substantially rectangularly bent retaining projection 98 is formed on the arcuate end portion of the retaining plate 97 which is located farther from the drive shaft 52. As the retaining plate 97 rotates with the drive shaft 52, the retaining projection 98 of the retaining plate 97 engages the pin 94 of its corresponding pressurizing lever 90 so as to overlie the same, as shown in FIG. 6. The timing for the engagement of the retaining projection 98 of the retaining plate 97 with the pin 94 of the pressurizing lever 90 is set when the pressurizing lever 90 is rocked to its lowest position, that is, when the pressurizing piston 80 is located at the bottom dead point. In FIG. 6, the cams 95, 53 and 77 are not shown.

A substantially funnel-shaped chute 99 for feeding the coffee powder into the brewing chamber 81 of the brewing cylinder 67 is disposed near the brewing cylinder 67 on the side opposite to the pressurizing levers 90 and the lift levers 72, located between the side plates 11 of the brewing unit 10. The chute 99 is rockably supported at the upper end portion by a support shaft 100 on the opposite side to the pressurizing levers 90. A retaining block 101 is fixed to the upper end portion of the chute 99 on the side of the pressurizing levers 90, extending toward the pressurizing levers 90. The retaining block 101 rests on the upper surfaces of the free ends of the two pressurizing levers 90. When the chute 99 and the pressurizing levers 90 are in the position shown in FIG. 2, the lower end of the chute 99 faces on the interior of the brewing chamber 81 of the brewing cylinder 67 through an opening 102 formed in the upper portion of the outer peripheral wall of the brewing cylinder 67.

The top opening of the chute 99 is connected to a fixed-quantity feed mechanism (not shown) for fixed-quantity supply or coffee powder or another type of powdered beverage.

The pressurizing piston 80 is fitted with a flexible hot-water supply hose 103, one end of which is connected to the injection chamber 84. As shown in FIG. 3, the other end of the hot-water supply hose 103 projects from one of the side plates 11 of the brewing unit 10. The projected end of the hot-water supply hose 103 is connected to a hot-water supply socket 104, which is fixed to the outer surface of the one side plate 11 by means of a metal fixture 105.

The hot-water supply socket 104 is removably connected to a hot-water supply plug 107 of a hot-water supply unit 106. The hot-water supply plug 107 is fixed to a base plate 108 of the hot-water supply unit 106. The hot-water supply plug 107 is connected with one end of a flexible hot-water supply hose 109, the other end of which is connected through a pressure pump (not shown) to a hot-water tank (not shown) disposed on the base plate 108 and kept at a high temperature of, e.g., 95° C. or more. The pressure pump pressurizes a predetermined quantity of hot water of 95° C. or more to about 10 kg/cm$^2$ and delivers it from the hot-water tank at a predetermined time mentioned later.

As shown in FIG. 3, a pair of guide pins 110 are attached individually to both end portions of the base plate 108 of the hot-water supply unit 106. The guide pins 110 are passed individually through guide holes 111 which are formed in both end portions of the side plates 11 of the brewing unit 10. Thus, in this embodiment, the base plate 108 of the hot-water supply unit 106 is attached to the outer surface of the one side plate 11 of the brewing unit 10, and the hot-water supply plug 107 of the hot-water supply unit 106 is connected to the hot-water supply socket 104 of the brewing unit 10.

Figure 7:
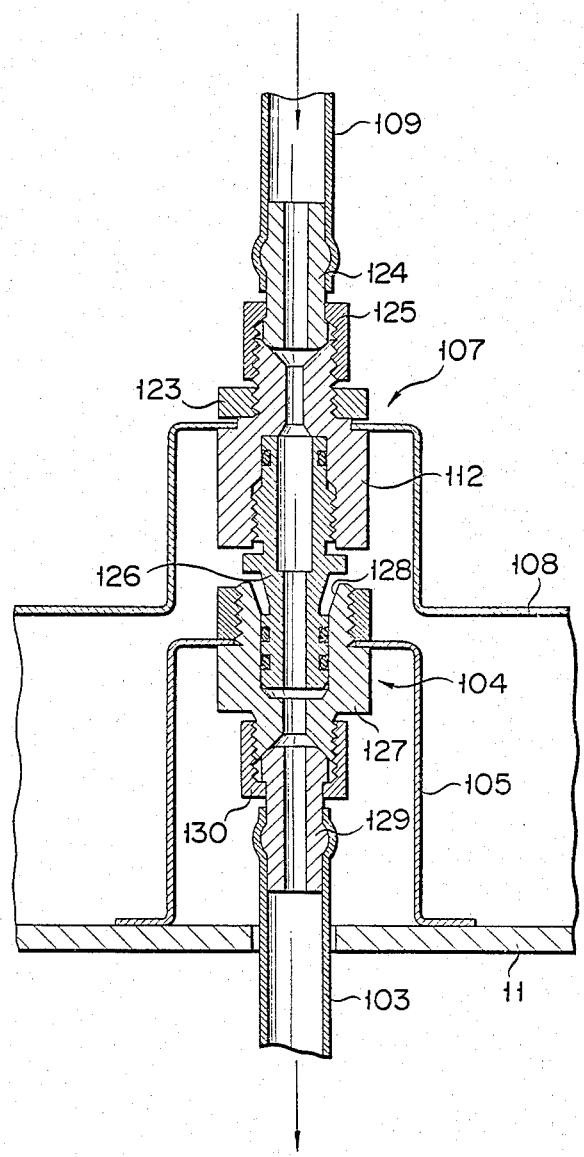
FIG. 7 is an enlarged sectional view corresponding to section VII of FIG. 3.

FIG. 7 shows in detail how the hot-water supply socket 104 and the hot-water supply plug 107 are connected. The hot-water supply plug 107 has a plug body 112. The plug body 112 is fixed to the base plate 108 by means of a nut 123. A connecting pipe 124 connected to one end of the hot-water supply hose 109 by force fit is coupled to one end of the plug body 112 by means of a cap nut 125. An insert pipe 126 with O-rings thereon is screwed in the other end of the plug body 112. The insert pipe 126 is inserted in a liquid-tight manner in an insert hole 128 which is formed in one end of a socket body 127 of the hot-water supply socket 104. Like the plug body 112, the socket body 127 is coupled at the other end with the hot-water supply hose 103 with the aid of a connecting pipe 129 and a cap nut 130.

The low-temperature hot water source connected with the hot-water hose 28 may be mounted on the base plate 108 of the hot-water supply unit 106.

Figure 11:
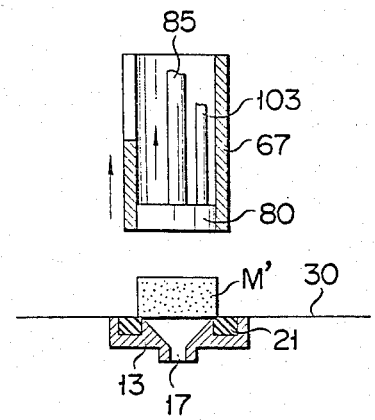
Figure 12:
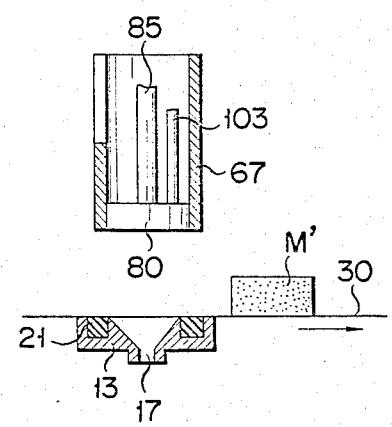
Figure 13:
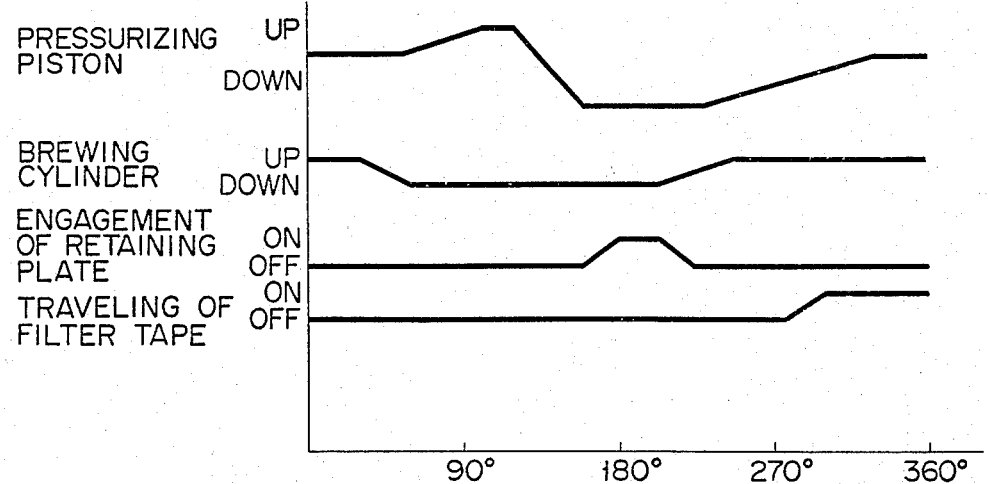
FIG. 13 is a timing chart showing the movements of several moving parts of the beverage brewing apparatus of FIG. 2.
Figure 14:
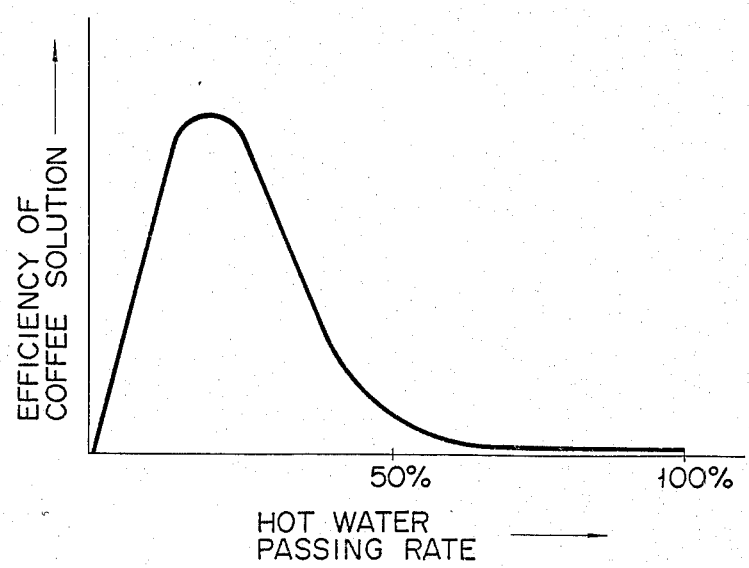
FIG. 14 shows a characteristic curve representing the brew characteristic of coffee essence extracted into hot water.

Referring further to FIGS. 8 to 14, the operation of the above-mentioned beverage brewing apparatus will be described. FIGS. 8 to 12 show coffee solution brewing steps in due order, and FIG. 13 is a timing chart for illustrating the movement of the principal moving members of the brewing apparatus.

Figure 8:
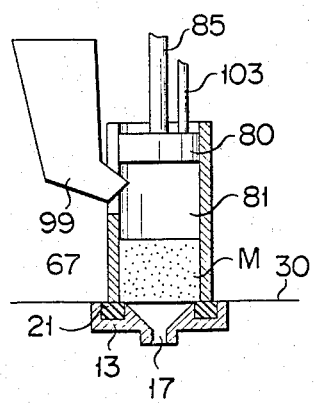
FIGS. 8 to 12 are schematic sectional views for illustrating steps of coffee solution brew.
Figure 9:
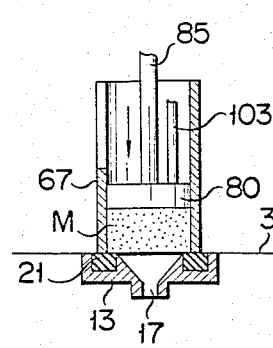

When a customer puts some coins into the automatic vending machine in which the brewing apparatus is on stand-by, thereby giving an instruction for the start of the coffee solution brewing step, a fixed quantity of coffee powder M is fed from the fixed-quantity feed mechanism into the chute 99 and then into the brewing chamber 81, as shown in FIG. 8. Thereafter, the drive shaft 52 is rotated clockwise through a predetermined angle. As the drive shaft 52 rotates, the cams 53, 77 and 95 and the retaining plate 97 are rocked. As the plane cam 95 rocks, the pressurizing levers 90 are rocked downward, so that the pressurizing piston 80 is moved down in the brewing cylinder 67, as shown in FIG. 9. Thus, the coffee powder M fed into the brewing chamber 81 of the brewing cylinder 67 is pressurized and compressed. As the pressurizing levers 90 rock downward, the chute 99 is rocked clockwise around the support shaft 100 with its retaining block 101 kept engaged with the free ends of the pressurizing levers 90. As a result, the lower end of the chute 99 is removed from the opening 102 of the brewing cylinder 67, allowing the pressurizing piston 80 to descend. When the pressurizing piston 80 is at the bottom dead point, the retaining projection 98 of the retaining plate 97 downwardly engages the pin 94 of the one pressurizing lever 90, as shown in FIG. 6, as the retaining plate 97 rocks. In this state, therefore, the retaining plate 97 prevents the pressurizing levers 90 from rocking upward. At the same time, the plane cam 77 is also rocked by the rotation of the drive shaft 52. At this point of time, however, the rocking of the plane cam 77 has no influence on the rocking motion of the lift levers 72. Namely, at this time, the lift levers 72 are held in the position shown in FIG. 2.

Thereafter, a predetermined quantity of high-temperature hot water is poured through the hot-water supply hose 103 into the brewing chamber 81 of the brewing cylinder 67 which is filled with the material powder M. As described before, the hot water poured in this manner is heated to 95° C. or more and pressurized to about 10 kg/cm$^2$. Thus, as the hot water permeates through the voids between the grains of the powder M in the brewing chamber 81, a coffee solution is percolated. The percolated coffee solution is transmitted through the filter tape 30 on the stage surface 15 of the stage 13 to flow into the brewing hole 17 of the stage 13, and then runs out of the brewing hole 17 into the funnel 22. At this point of time, the hole 23 is closed by the pinch valve 25, so that the coffee solution introduced into the funnel 22 is temporarily stored therein until its brew is completed.

When the brew of the coffee solution is finished, the hose 23 is opened by the pinch valve 25, so that the coffee solution in the funnel 22 is rushed into the trough 24 through the hose 23. At the same time, the hot-water hose 28 is opened by the pinch valve 29 to allow hot water of a relatively low temperature to be fed into the trough 24, and sugar and/or cream are suitably added to the coffee solution by the nozzles 26 and/or 27 according to the customer's preference.

The coffee solution, thus mixed with the sugar and/or cream in the trough 24, is poured into a coffee cup placed under the trough 24 and served to the customer.

The reason why the hot water fed by the hose 28 is added to the percolated coffee solution will now be explained. This reason is apparent from the brewing characteristic curve of coffee solution shown in FIG. 14. As seen from FIG. 14, most of coffee essence is percolated in the initial stage of the hot water injection. Therefore, even though hot water for a cup of coffee is poured into the brewing chamber 81, that portion of the hot water which is poured in the final stage of the injection cannot have a part in the brew of the coffee solution. In this embodiment, therefore, the trough 24 is connected to the additional hose 28 which supplies hot-water so that only a reasonable quantity of hot water which was efficiently used in the brew is poured into the brewing chamber 81 through the hot-water supply hose 103, and so that an additional amount or hot water can be fed through the hose 28. Thus, the quantity of hot water actually used in the brew of the coffee solution may be reduced, so that the time required for the brew can be shortened. Considering these circumstances conjointly with the reduction of the time for the coffee solution brewing step achieved by the pressurization of the coffee powder and the injection of the pressurized hot water, the time required for the brew may greatly be shortened.

When the hot water is poured into the brewing chamber 81 of the brewing cylinder 67, the pressurizing piston 80 may be urged to move up by the pressure of steam produced from the hot water. As mentioned before, however, the pressurizing levers 90 are prevented from rocking upward by the retaining plate 97, so that the pressurizing piston 80 will never move upward at that time. Thus, in the coffee solution brewing step, the powdered beverage M in the percolating chamber 81 can securely be pressurized and compressed by the pressurizing piston 80.

Further, since the pressurizing piston 80 is moved downward by the urging force of the urging spring 93 through the medium of the pressurizing levers 90, the force of the pressurizing piston 80 to pressurize and compress the material powder M may be made substantially uniform even if the quantity of the powdered beverage M fed into the brewing chamber 81 of the brewing cylinder 67 is more or less subject to variations.

According to the present invention, as mentioned before, the efficiency of coffee solution brew can be improved by pressurizing the powdered beverage in the brewing chamber 81 by means of the pressurizing piston 80. Accordingly, the quantity of coffee powder required for each serving can be reduced. For additional improvement of the brewing efficiency, according to the invention, the grains of the powdered beverage are made finer than those of the powder used in the prior art apparatuses. The powder M used in this embodiment, for example, is of approximately grains corresponding to 48-mesh (JIS), as compared with the powder of approximately grains corresponding to 35-mesh, used in the prior art coffee brewing apparatuses. As a result, the quantity of coffee powder required for each cup is reduced from 10 to 12 g of the conventional case to 5 to 7 g, that is, it is substantially halved.

Figure 10:
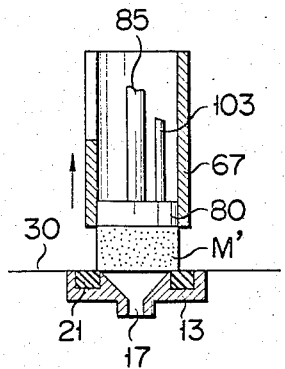

After the coffee solution percolating step is finished in this manner, the drive shaft 52 is further rotated clockwise through the predetermined angle, so that the cams 54, 77 and 95 and the retaining plate 97 are also rocked. As the plane cam 77 rocks, the lift levers 72 are rocked upward, so that the brewing cylinder 67 is moved upward. Even if the plane cam 95 is rocked in the initial stage of the upward movement of the brewing cylinder 67, the pressurizing levers 90 will stay in position to locate the pressurizing piston 80 at its bottom dead point. In the initial stage of the upward transfer of the brewing cylinder 67, therefore, coffee grounds M' from the powder M in the brewing chamber 81 are removed therefrom as the brewing cylinder 67 ascends, as shown in FIG. 10. In removing the coffee grounds M', the retaining plate 97 is rocked so that the retaining projection 98 thereof is disengaged from the pin 94 of its corresponding pressurizing lever 90. Thereafter, when the plane cams 77 and 95 are further rocked, the pressurizing levers 90 and the lift levers 72 are rocked upward together, so that the brewing cylinder 67 and the pressurizing piston 80 are moved up together, as shown in FIG. 11. Thus, when the coffee grounds M' are released from both the brewing cylinder 67 and the pressurizing piston 80, the cam 53 rocks so that the cam projection 54 thereof abuts against the pin 49 of the gear 47, as described before. Thereupon, the pinch roller 36 is rotated through the medium of the gear 47, the pinion 43, the sprockets 41 and 40, and the chain 42, so that the filter tape 30 is wound on the take-up roll 38 for the predetermined length. As a result, the coffee grounds M' are removed from the stage surface 15 of the stage 13, as shown in FIG. 12, and another part of the filter tape 30 is fed afresh onto the stage surface 15. When the cam 77 rocks at this time, the lift levers 72 and hence the brewing cylinder 67 are moved downward and are returned to the initial position shown in FIG. 2. Thus, the brewing process for a cupful of coffee solution is ended. As seen from the timing chart of FIG. 13, the brewing process is accomplished by one revolution of the drive shaft 52.

As the aforementioned brewing process is repeated, the filter tape 30 is successively wound on the take-up roll 38 so that the diameter of the tape-up roll 38 increases as indicated by an imaginary line in FIG. 2. In this case, however, the take-up roll 38 is only rockably mounted on the rocking arm 37, and the force to take up the filter tape 30 is given by the rotation of the pinch roller 36. Accordingly, the filter tape 30 is wound on the take-up roll 38 with a constant force irrespective of the diameter of the take-up roll 38. At the time of winding, therefore, there will be no possibility of the filter tape 30 being cut or inadequately delivered due to insufficient winding force. In other words, the filter tape 30 can securely be delivered for a fixed length at a time and by inches.

The coffee grounds M' are moved together with the filter tape 30 as the filter tape 30 is intermittently played out. When passing through the right-end guide roller 34 of FIG. 4, the grounds M' drop from the filter tape 30 to be discharged into the waste bucket 66 located under the guide roller 34. Part of the grounds M' remaining on the filter tape 30 is scraped therefrom into the waste bucket 66 as it passes by the guide claw 65. Thus, when the brewing process is repeated, the filter tape 30 is fed a fresh onto the stage surface 15. Therefore, the coffee solution excels in the sanitation and has a delicious taste.

Figure 15:
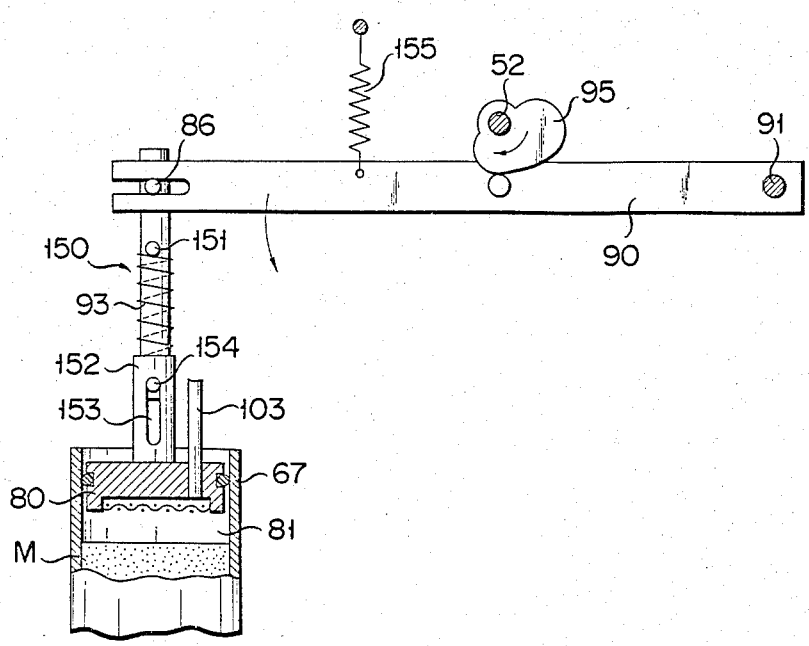
FIGS. 15 and 16 show modifications of a pressurizing lever rocking mechanism.

The present invention is not limited to the above embodiment. Referring to FIG. 15, there is shown a modification of the pressurizing piston moving mechanism 89. In this modification, a piston rod 150 of the pressurizing piston 80 is formed of first and second rod portions 151 and 152. The first rod portion 151 is slidably fitted in the second rod portion 152. A guide slot 153 is formed in the outer peripheral surface of the second rod portion 152. A pin 154 protruding from the first rod portion 151 is fitted in the guide slot 153 of the second rod portion 152. Thus, the piston rod 150 can be extended and contracted for a predetermined length. The urging spring 93 is stretched between the first and second rod portions 151 and 152. In FIG. 15, numeral 155 designates a return spring for the pressurizing lever 90. It is to be understood that the piston moving mechanism of this modification has the same function as the aformentioned piston moving mechanism.

Figure 16:
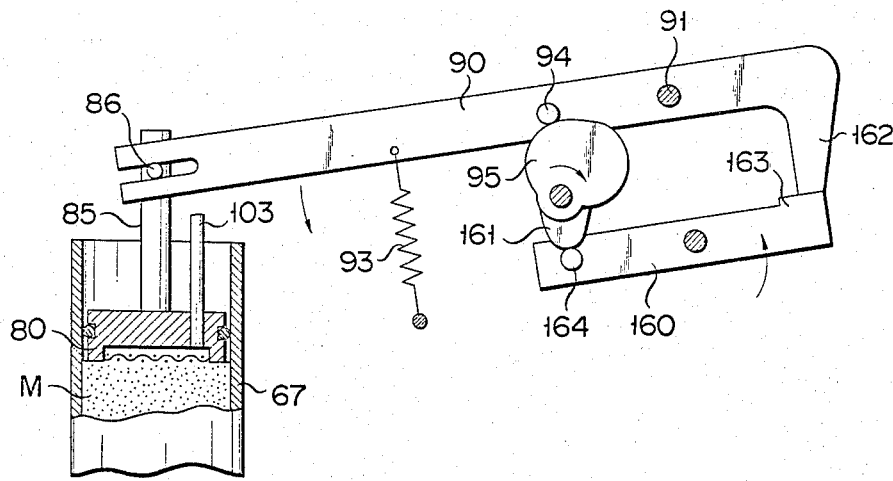
Figure 18:
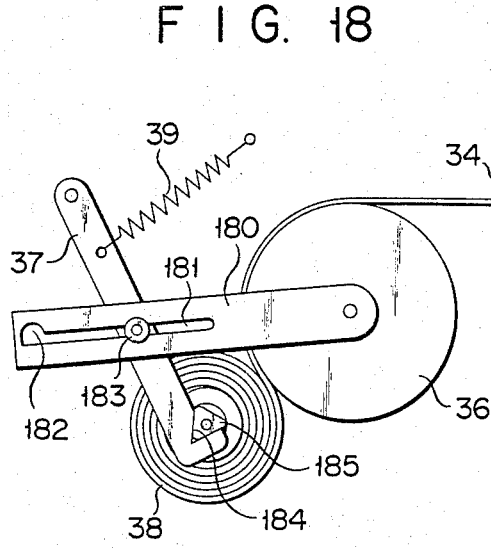
FIG. 18 shows a modification of a take-up mechanism for the filter tape.

Referring to FIG. 16, there is shown another modification of the moving mechanism. In this second modification, a retaining arm 160 and a retaining cam 161 are used in place of the retaining plate 97. The retaining arm 160 is rockably supported at its central portion. An abutting portion 163 capable of abutting against a retaining portion 162 at one end of the pressurizing lever 90 is formed at one end of the retaining arm 160. A pin 164 protruding from the other end portion of the retaining arm 160 engages the retaining cam 161 which is mounted on the drive shaft 52. In the modification shown in FIG. 16, the retaining arm 160 is rocked counterclockwise by the retaining arm 161 when the pressurizing lever 90 is rocked downward. Thus, as the abutting portion 163 of the retaining arm 160 engages the retaining portion 162 of the pressurizing lever 90, the pressurizing lever 90 is prevented from rocking upward.

Figure 17:
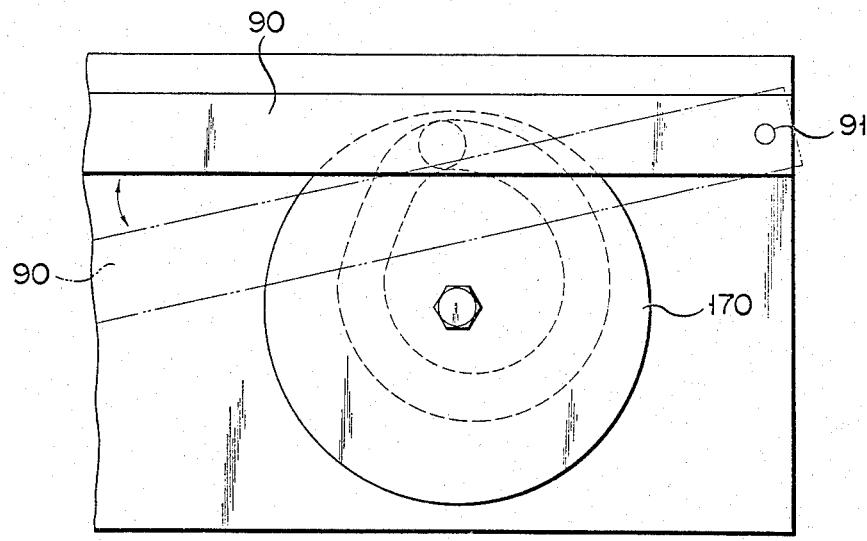
FIG. 17 shows another modification of the pressurizing lever rocking mechanism.

Referring further to FIG. 17, there is shown still another modification of the invention. In this modification, a grooved cam 170 is used in place of the plane cam 95 for vertically rocking the pressurizing lever 90. The use of the grooved cam 170 obviates the necessity of the retaining plate 97, the retaining arm 160, and the retaining cam 161.

Referring now to FIGS. 18 to 22, there is shown a modification of the take-up mechanism. In this modification, a pair of arms 180 are rotatably mounted on the roller shaft of the pinch roller 36. A guide slot 181 is formed in each of the arms 180. A substantially semicircular notch 182 is formed at the extreme end portion of the upper edge of the guide slot 181 farthest from the pinch roller 36. A pin 183 protruding from the central portion of the swinging arm 37 is fitted in the guide slot 181 of each arm 180 so as to be slidable along the guide slot 181.

A V-shaped notch 184 is formed at the lower end portion of the swinging arm 37. One side of the notch 184 which extends substantially at right angles to the longitudinal direction of the rocking arm 37 is longer than the other. A substantially triangular bearing portion 185 for the take-up roll 38 is fitted in the notch 184.

Figure 20:
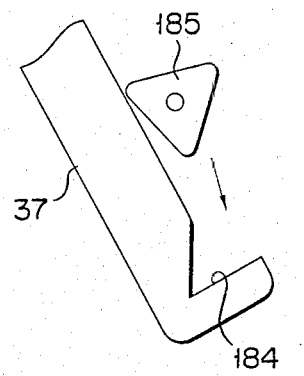
FIGS. 20 to 22 are diagrams for illustrating the manner of attaching the take-up roll to the take-up mechanism of FIG. 18.
Figure 19:
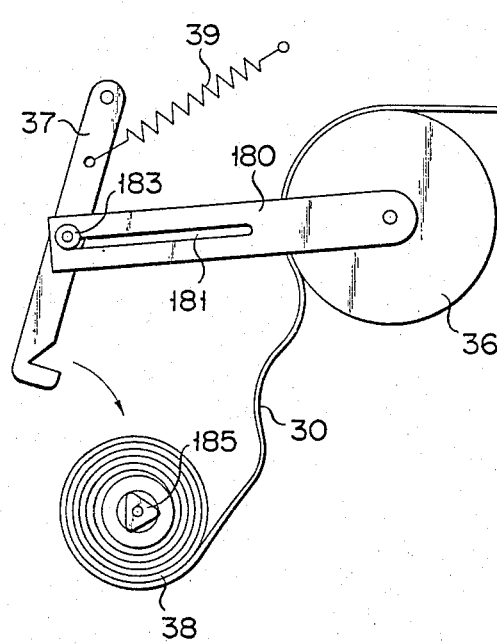
FIG. 19 is a diagram for illustrating the manner of removing a take-up roll from the take-up mechanism shown in FIG. 18.
Figure 21:
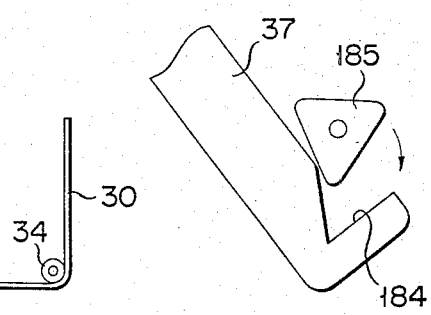
Figure 22:
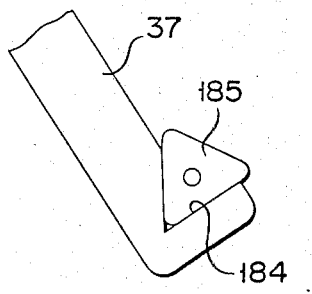

In the modification of the take-up mechanism constructed in this manner, the take-up roll 38 can easily be removed for replacement by only rocking the swinging arm 37 clockwise so that the pin 183 of the swinging arm 37 is fitted in the notch 182 of the arm 180, as shown in FIG. 19. In attaching the take-up roll 38 to the swinging arm 37, the bearing portion 185 of the take-up roll 38 is set in the notch 184 of the swinging arm 37, and then the take-up roll 38 is brought into rolling contact with the pinch roller 36 by the urging force of the spring 39. In replacing the take-up roll 38 in this take-up mechanism, as shown in FIGS. 20 to 22, the bearing portion 185 can be accurately fitted in the notch 184 by the weight of the take-up roll 38 and the rocking force of the swinging arm 37 even though the engagement between them is not accurate in the initial stage.

In the above description of the several modifications, like reference numerals are used to designate like members.

What is claimed is:

1. An apparatus for extracting a beverage solution by brew, comprising:
   a base,
   a stage attached to the base and having a stage surface with a brewing hole, the brewing hole being covered with a rigid sheet member having a number of perforations and substantially flush with the stage surface;
   an elongate filter tape capable of traveling over the stage surface of the stage and the sheet member;
   filter tape driving means for intermittently driving the filter tape by inches, thereby intermittently locating new parts of the filter tape on the stage surface and the sheet member;
   a hollow brewing cylinder disposed on the stage surface side of the stage and having an axis perpendicular to the stage surface, at least one end of the brewing cylinder nearer to the stage being open;
   brewing cylinder moving means adapted to move the brewing cylinder axially, thereby bringing the open end of the brewing cylinder into liquid-tight contact with the stage surface with the filter tape therebetween so that the open end surrounds the brewing hole, and separating the open end of the brewing cylinder at a predetermined distance from the stage surface;
   a pressurizing piston slidably disposed in the brewing cylinder and designed so that a brewing chamber is defined inside the brewing cylinder by the inner wall surface of the brewing cylinder, the pressurizing piston, and the filter tape when the open end of the brewing cylinder is in liquid-tight contact with the stage surface through the medium of the filter tape;
   piston moving means for axially moving the pressurizing piston in the brewing cylinder;
   material powder supply means for feeding a predetermined quantity of material powder as material for the beverage solution into the brewing chamber defined inside the brewing cylinder; and
   hot-water supply means adapted to supply the brewing chamber with hot water pressurized to a predetermined pressure when the material powder is fed into the brewing chamber and pressurized by the pressurizing piston.

2. An apparatus according to claim 1, wherein the sheet member is formed of a wire net.

3. An apparatus according to claim 1, wherein the filter tape driving means includes a driving roller for intermittently playing out the filter tape from a supply roll wound with the filter tape and feeding the filter tape, and a take-up roll resiliently in rolling contact with the driving roller across the filter tape on the driving roller and fixedly fitted with the starting end of the filter tape, so that the filter tape is wound on the take-up roll as the take-up roll is rotated in the direction opposite to the rotating direction of the driving roller, accompanying the rotation of the driving roller.

4. An apparatus according to claim 3, wherein the filter tape driving means further includes a swinging arm rockable around one end thereof and rotatably supporting the take-up roll on the other end, and an urging spring for urging the swinging arm so that the take-up roll is resiliently in rolling contact with the driving roller across the filter tape.

5. An apparatus according to claim 1, wherein the piston moving means includes a pressurizing lever one end of which engages a piston rod extending from the pressurizing piston to the opposite side thereof to the open end of the brewing cylinder and the other end of which is rockably supported by a supporting shaft, and a rocking mechanism for rocking the pressurizing lever in both directions around the supporting shaft to reciprocate the pressurizing piston axially in the brewing cylinder.

6. An apparatus according to claim 5, wherein the rocking mechanism includes a pressurizing spring for urging the pressurizing lever so that the pressurizing piston is pressed toward the open end of the brewing cylinder by the pressurizing lever, and a rotatable first plane cam for rocking the pressurizing lever around the supporting shaft against the urging force of the pressurizing spring.

7. An apparatus according to claim 6, wherein the rocking mechanism further includes a retaining device adapted to fit to and retain the pressurizing piston in a predetermined pressurizing position inside the brewing cylinder when the pressurizing piston reaches the pressurizing position.

8. An apparatus according to claim 5, wherein the rocking mechanism includes a return spring for urging the pressurizing lever in a direction such that the pressurizing piston is moved away from the open end of the brewing cylinder by the pressurizing lever, and a rotatable second plane can for rocking the pressurizing lever around the supporting shaft against the urging force of the return spring, and the piston rod includes first and second rods and can be extended and contracted for a predetermined axial distance, the first and second rods being coupled to each other by means of a coupling spring.

9. An apparatus according to claim 5, wherein the rocking mechanism includes a rotatable grooved cam for rocking the pressurizing lever around the supporting shaft, and the piston rod includes first and second rods and can be extended and contracted for a predetermined axial distance, the first and second rods being coupled to each other by means of a coupling spring.

10. An apparatus according to claim 1, wherein the brewing cylinder moving means includes a rocking lever one end of which is rockably supported by a supporting shaft and the other end of which engages the brewing cylinder, and a third plane cam adapted to rotate to rock the rocking lever around the supporting shaft, the cam surface of the third plane cam being shaped so that the brewing cylinder is moved away from the stage surface of the stage before the pressurizing piston is moved away from the stage surface after hot water is poured into the brewing chamber inside the brewing cylinder for percolation with the open end of the brewing cylinder held against the stage surface in a liquid-tight manner and with the material powder in the brewing chamber pressurized by the pressurizing piston.

11. An apparatus according to claim 1, wherein the hot-water supply means supplies the brewing chamber of the brewing cylinder with hot water heated to 90° C. or more and pressurized to approximately 10 kg/cm$^2$.

* * * * *